Feb. 6, 1940. G. E. KING 2,189,606
WELDING SYSTEM
Filed Dec. 17, 1936
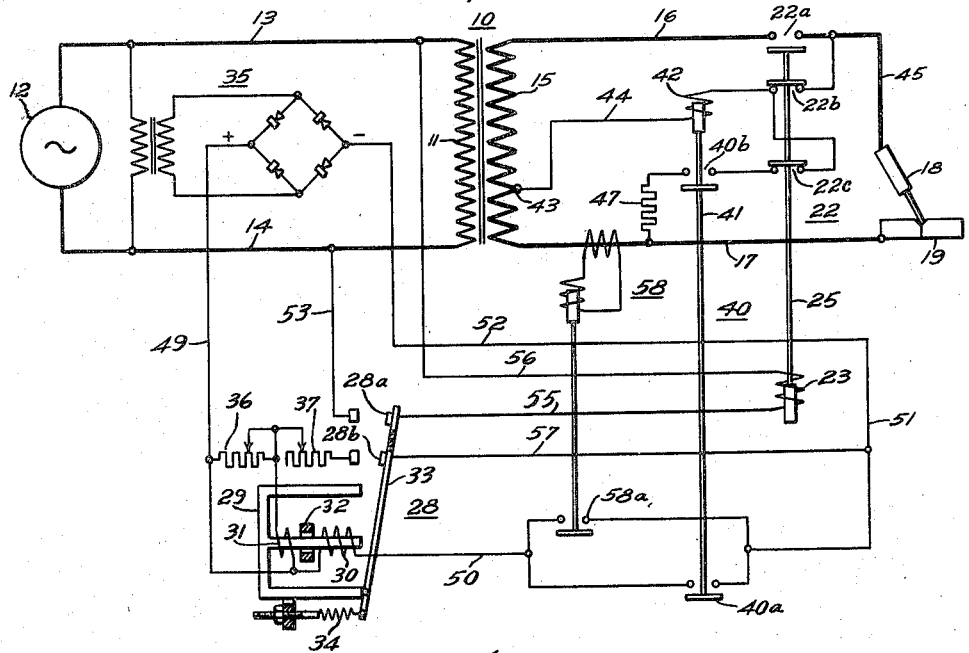
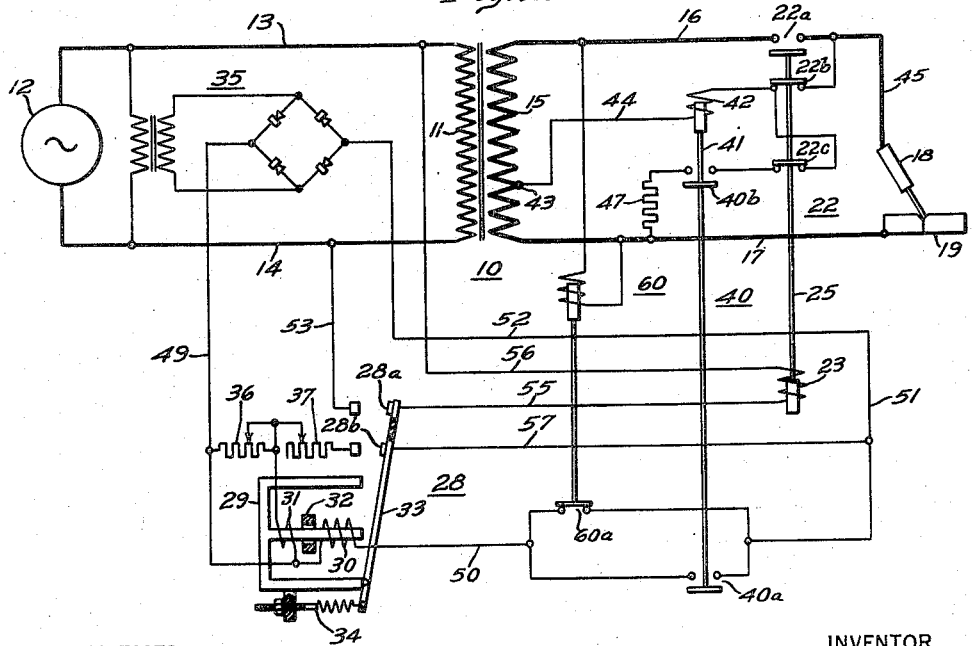
INVENTOR
George E. King.
BY
ATTORNEY Patented Feb. 6, 1940

2,189,606

UNITED STATES PATENT OFFICE 2,189,606

WELDING SYSTEM

George E. King, Wilkinsburg, Pa., assignor to Westinghouse Electric & Manufacturing Company, East Pittsburgh, Pa., a corporation of Pennsylvania Application December 17, 1936, Serial No. 116,322

7 Claims. (Cl. 171—119)

My invention relates, generally, to arc welding systems and it has reference in particular to a safety control system for an electric arc welding circuit.

In the art of electric arc welding, though it is common to use welding voltages of from 20 to 40 volts, it is not unusual, principally because of the characteristics of the source of welding current, to have open circuit voltages of much higher values. In some instances, and particularly in the case of alternating current welding transformers, it is not unusual to have open circuit voltages of as high as 140 volts. Such voltages have been found highly desirable in aiding the operator to strike and maintain an arc. Particularly so, is this the case on construction jobs in the field, where coatings of paint or rust on the beams or girders are likely to increase the contact resistance with the electrode, making it difficult for the operator to satisfactorily strike an arc. The maintenance of the arc also is greatly improved by having a high open circuit voltage, inasmuch as such a voltage prevents frequent extinction of the arc due to momentary irregularities of current flow.

While such high open circuit voltages are advantageous in increasing the ease of welding, they have been found to be somewhat hazardous to the operator. Contact with such high potentials may be dangerous, and such contact is often apt to be made when an operator is changing electrodes while the machine is in operation. Particularly is this so in the case of alternating current sources of supply because of the severe shocks received from the passage of an alternating current through an operator's body.

Various safety control systems have been evolved to prevent an operator from being subjected to the relatively high open circuit voltage of the welding machine while handling the electrode. In most of these systems a reduced control voltage is normally placed across the electrode while the operator is not welding. Upon his striking the electrode against the work, this relatively low control voltage is utilized to complete the circuit for closing a line switch to apply the full welding voltage to the electrode. Time delay means are usually incorporated in order to maintain this welding voltage across the electrode for a short time interval after the cessation of welding in order to prevent too frequent opening of the line switch on account of slight irregularities in welding current. It has been found from practice that a time delay in the opening of the line switch after cessation of welding, of the order of one second is most advantageous in preventing the line switch from opening too frequently, and yet allowing the low control voltage to be applied to the electrode before the operator will normally have time to grasp the electrode for the purposes of changing it.

While most of these systems have proven effective to some degree, they have not been as successful as might be desired for the reason that they do not provide for positive operation of such nature as to always insure that the electrode will become disconnected from the full voltage source at a predetermined time after the termination of the welding operation or upon the occurrence of a relay or coil failure. In addition, the prior art systems do not function in such manner as to permit the operator to readily strike the arc without making repeated efforts.

It is, therefore, the general object of my invention to provide an alternating current arc welding system which shall be of simple and economical construction, positive in operation and which shall provide the maximum degree of safety to the operator.

A more specific object of my invention is to provide a safety control system for an electric arc welding circuit that shall function to positively and immediately connect the electrode to the full circuit voltage only when the electrode is brought into engagement with the work.

Another object of my invention is to provide a safety control system for a welding circuit that will positively function to disconnect the electrode from the full circuit voltage at the expiration of a predetermined time interval after the cessation of the welding operation.

A further object of my invention is to provide a safety control system for an arc welding circuit that will not function to apply the relatively high open circuit voltage of the circuit to the electrode in the event of the failure in any manner of the safety control.

A still further object of my invention is to provide a safety control system for an arc welding circuit that shall function to positively disconnect the electrode from the full circuit voltage at the expiration of a predetermined time interval after the cessation of a welding operation.

Other objects will in part be obvious, and in part appear hereinafter.

My invention, accordingly, is disclosed in the embodiments hereof shown in the accompanying drawing, and comprises the features of construction, arrangement of parts, and combination of elements which will be exemplified in the construction hereinafter set forth, and the scope of the application of which will be indicated in the appended claims.

For a more complete understanding of the nature and scope of my invention, reference may be had to the following detailed description taken in conjunction with the accompanying drawing in which:

Figure 1 is a diagrammatic view of a welding circuit or system embodying the principal features of my invention, and Fig. 2 is a diagrammatic view of a welding system or circuit employing an alternative form of my invention.

In the preferred form of my invention, a source of welding current, such as the secondary winding of a transformer, which may be provided with a low voltage tap, is disposed to be connected by a line switch to a welding circuit, containing an electrode and work upon which a welding operation is to be performed, when the electrode is brought into engagement with the work.

To accomplish this result, a control relay, which may be of a sensitive, high speed type, is employed in a manner such that upon contact of the electrode with the work, the relatively low voltage from the tap on the secondary winding is applied to the relay to cause its operation. The operation of this relay results in the establishment of a circuit to hold it closed and the energization of a time delay relay which in turn causes closure of the main line switch. The time delay relay is disposed to maintain the line switch in the closed position for a predetermined time after the welding operation has ceased. While the welding operation continues, control means, responsive to the continuation of a welding process, function to maintain the time delay relay in the energized position, thus ensuring that the line switch remains closed. Thus, the relatively high operating voltage is not applied to the electrode until contact is made with the work, and a predetermined time after cessation of a welding operation the electrode is disconnected from this relatively high operating voltage.

By utilizing a control relay operative from the low control voltage to establish its own holding circuit, it is not necessary for the operator to maintain the electrode in contact with the work waiting for the building up of the welding current to ensure that the time delay relay will close and remain closed once it is operated.

Referring particularly to Fig. 1, the reference numeral 10 denotes generally a source of welding current, in this instance shown as a transformer having a primary winding 11 connected to a generator source 12 through conductors 13 and 14. The secondary winding 15 is adapted to be connected through conductors 16 and 17 to a welding circuit, which includes an electrode 18 and work 19.

To prevent the high open circuit voltage of the secondary winding 15 from being applied to the electrode 18 when a welding process is not in operation and the transformer 10 is energized, the normally open contact members 22a of a line switch 22 may be disposed in series circuit relation with secondary winding 15 and the electrode 18. The line switch is provided with an operating winding 23 for actuating its armature 25 with which the normally open main contact members 22a, and the normally closed auxiliary contact members 22b and 22c are associated.

In order to control the operation of the line switch 22 to effect its closure when it is desired to perform a welding operation, and to hold it closed for a predetermined time after the cessation of the welding operation, a time delay relay 28 having "make" contact members 28a and 28b may be provided. In this instance a relay is shown which comprises generally an E-shaped magnetic core 29, with a main operating winding 30, an oppositely wound neutralizing winding 31, and a short circuited damper winding 32 positioned on the central leg of the magnetic core 29. A pivoted armature 33 with which the make contact members 28a and 28b are associated, may be provided with an adjustable biasing spring 34. The windings 30 and 31 of this relay may be energized from a source of direct current, such as control transformer and rectifier system 35. As operation of this time delay relay depends upon the delayed decay of magnetic flux in the core 29, due to the short circuited damper winding 32, a shunt adjusting resistor 36 and a series adjusting resistor 37 are disposed to vary the effectiveness of the neutralizing winding 31. By adjustment of these resistors and manipulation of the armature biasing spring 34, the armature 33 may be maintained in the closed position for a predetermined time after deenergization of the main operating winding 30.

Energization of the time delay relay 28 is effected through the operation of a control relay 40 having normally open contact members 40a and 40b associated with an armature 41. To secure operation of the control relay 40, an operating winding 42 may be provided. The operating winding 42 is energized upon contact of the electrode 18 with the work 19 by means of a relatively low control voltage from the tap 43 on the secondary winding 15 of the welding transformer 10, through the conductor 44, operating winding 42, normally closed contact members 22b, conductor 45, electrode 18, work 19, and conductor 17 back to the secondary winding of the transformer 10.

Operation of the armature 41 closes the normally open contact members 40a and 40b. A holding circuit for the operating winding 42 is thereby established from tap 43 through conductor 44, operating winding 42, the normally closed contact members 22c, the normally open contact members 40b, control resistance 47, and conductor 17 back to the secondary winding of the transformer 10.

Closure of the normally open contact members 40a provides a circuit for the energization of the main operating winding 30 of the time delay relay 28, from the rectifier source 35 through the conductor 49, operating winding 30, conductor 50, contact members 40a, conductor 51, and conductor 52 to the other side of the rectifier source 35. Operation of the armature 33 of the time delay relay 28 closes the normally open contact members 28a and 28b, thereby completing an energizing circuit for the operating winding 23 of the line switch 22 from the source 12, through conductor 14, conductor 53, contact members 28a, conductor 55, the operating winding 23, conductor 56, and conductor 13 to the other side of the source 12.

It will be observed that the closure of the normally open contact members 28b of the time delay relay 28 is required to complete the circuit for the neutralizing winding 31 which extends from one terminal of the rectifier source 35, through conductor 49, winding 31, series resistor 37, contact members 28b, conductors 57, 51 and 52 to the opposite terminal of the rectifier source. Thus, the neutralizing winding 31 cannot be energized until the time delay relay has closed, aiding greatly in speeding up the operation of this relay, as it is not now necessary for the main winding 30 to buck the oppositely disposed neutralizing winding 31 before the armature 33 can close.

Therefore, upon closure of the time delay relay 28 the line switch 22 is energized and closes its normally open contact members 22a completing the welding circuit and applying the full voltage of the secondary winding 15 to the electrode 18.

It will be observed that when the line switch 22 closes, its contact members 22b and 22c are opened. The opening of contact members 22b disconnects the electrode 18 from the low voltage tap 43. The opening of contact members 22c breaks the holding circuit through the winding 42 of the control relay 40 which opens its contact members 40a to interrupt the original energizing circuit for the time delay relay 28.

In order to provide for holding the time delay relay 28 in its closed position during a welding operation and to deenergize its main operating winding 30 as soon as the welding operation is terminated, a relay 58 responsive to the continuation of the welding operation is provided. In this instance this relay is responsive to the flow of welding current through the conductor 17 and is actuated to close its contact members 58a and thus re-establish the energizing circuit for the main coil 30 of the time delay relay 28 before this relay can function to open its contact members 28a.

As soon, however, as the welding operation is terminated and welding current ceases to flow through conductor 17, the current responsive relay 58 opens to deenergize the main winding 30 of the time delay relay 28. After a predetermined time interval for which the relay 28 is adjusted, its contact members 28a and 28b are opened. The opening of contact members 28a deenergizes the line switch 22 which opens its contact members 22a to disconnect the electrode 18 from the full voltage of the transformer 10. The closure of contact members 22b again connects the electrode 18 to the low voltage tap 43, thus applying a relatively low and harmless voltage to the electrode.

Referring now to Fig. 2 it will be observed that the system shown is generally the same as the system of Fig. 1 and like reference numerals have been used to indicate like parts. However, in this embodiment of the invention the relay 60 which is utilized to maintain the main operating winding 30 of the time delay relay 28 energized during a welding operation is of a different type and is responsive to the voltage of the welding circuit instead of the welding current.

In this instance the operating winding of the relay 60 is connected directly across the secondary winding 15 of the transformer 10. By utilizing a voltage responsive relay connected in this manner, the maximum voltage to which the operating winding will ever be subjected, namely, the open circuit voltage of the transformer 10, is known and is much higher in value than if the operating winding of this relay were connected to the low voltage tap 43. This permits the use of an operating winding for relay 60 which embodies better design features and which will not fail in service, thus greatly increasing the safety factor of the system.

In the operation of the system of Fig. 2, when the electrode 18 is disengaged from the work 19, the operating winding of relay 60 is subjected to the full open circuit voltage of the transformer secondary winding 15 and its contact members 60a are held open. As soon, however, as the welding operation is instituted and line switch 22 closes, the voltage across the transformer is reduced to such extent as to release relay 60 which closes its contact members 60a. This reestablishes the energizing circuit for the main operating winding 30 of the time delay relay 28 after it has been opened by the control relay 40.

When the welding operation is terminated the voltage of the secondary winding 15 increases and the relay 60 is again energized sufficiently to actuate contact members 60a to the open position to deenergize the time delay relay 28 and thus release the line switch 22 after a predetermined time interval.

It may be seen that in the above embodiments of my invention I have provided control means for an arc welding system in which the full operating voltage of the source is applied to the electrode only upon contact of the electrode with the work, and remains applied for only a predetermined interval of time after cessation of the welding operation. The operator is therefore protected from the hazard of contact with this high operating voltage while changing electrodes. Further, it may be seen that through the use of a sensitive and self-locking control relay for initially energizing the time delay relay, positive operation of this relay is secured, thus assuring closure of the line switch immediately the electrode is brought in contact with the work, and independently of the building up of the welding current.

The systems disclosed not only provide the maximum degree of safety to the operator during normal operation but also provide a high degree of protection against any accidental application of the open circuited voltage of the transformer to the electrode when a welding operation is not in progress. In one instance this is accomplished by so arranging the elements of the system that the failure of any one of them will prevent the connection of the electrode to the full operating voltage or interrupt the connection in case it is made. In the other instance the system is so designed that the possibility of failure of a control element is reduced to a minimum.

As certain changes may be made in the foregoing construction, and different embodiments of the invention may be made without departing from the spirit thereof, it is intended that all matter shown in the accompanying drawing and contained in the foregoing description shall be considered as illustrative and not in a limiting sense.

I claim as my invention:

1. An electric system comprising, in combination, a load circuit including manual means for completing the circuit, a source of current for the load circuit having a reduced voltage tap to provide a control voltage, a line switch operable to connect the load circuit across the source, a time delay relay operable to energize the line switch, said time delay relay being operable to hold the line switch closed for a predetermined time after said time delay relay is deenergized, a relay operable upon energization from said reduced voltage tap on closure of said manual means for initiating the energization of the time delay relay and relay means responsive to the connection of the load to the source to maintain an energizing circuit for the time delay relay during the said connection of the load thereto.

2. The combination in a control system, of a transformer having a secondary winding with a relatively high open circuit voltage and provided with a relatively low control voltage tap, a supply circuit including means for connecting a load to the supply circuit, a line switch operable to apply the relatively high secondary voltage to the supply circuit, time delay means operable upon energization to effect closure of the line switch, normally deenergized control relay means operable from the low voltage tap upon connection of the load to the supply circuit to energize the time delay means, and relay means responsive to a reduction in secondary voltage when the load is connected to maintain the time delay means in the energized position while the load is connected, said time delay means being disposed to maintain the line switch in the energized position for a predetermined time after the load is disconnected.

3. In a protective control for a power system, the combination comprising, a transformer having a secondary winding with a low control voltage tap, a load circuit including means for closing the load circuit, a line switch having a plurality of normally closed auxiliary contact members and operable to connect the load circuit across the secondary winding of the transformer, a time delay relay for effecting the operation of the line switch, sensitive control relay means having an operating winding and a plurality of make contact members, circuit means connecting said operating winding to the low control voltage tap in series circuit relation with one of said normally closed contact members of the line switch and the load circuit closing means to effect the operation of the sensitive control relay upon closure of the load circuit to initiate the energization of the time delay relay, circuit means including one of said make contact members on the sensitive control relay and another of said normally closed auxiliary contact members on the line switch disposed in shunt relation with the control voltage portion of the transformer secondary winding and the operating winding to provide a holding circuit for the sensitive control relay, and relay means for maintaining the time delay relay in the energized position during closure of the load circuit, said time delay relay being disposed to ensure energization of the line switch until a predetermined interval of time after the load circuit has been opened.

4. A protective system for a power system including a load circuit with means for manually opening and closing the load circuit comprising, switch means operable to connect the load circuit to a relatively high voltage source having a relatively low voltage tap, a time delay relay operable to effect operation of the switch means and retain the switch means in the operated position for a predetermined interval of time after the load circuit is opened, a control relay, circuit means associated with the switch means for effecting energization of the control switch from the low voltage tap upon the closure of the load circuit to initiate the operation of the time delay relay, and relay means for maintaining the time delay relay in the operated position during the closure of the load circuit.

5. The combination with a power system having a load circuit with means for manually opening and closing the circuit and a source of power having a relatively high voltage provided with a relatively low voltage tap, of a protective control system for effecting the connection of the load circuit to the relatively low voltage tap when the load circuit is manually opened comprising, a line switch operable to connect the load circuit across the source, said line switch having a plurality of normally closed auxiliary contact members, a time delay relay for effecting the operation of the switch, a normally deenergized high speed control relay for initiating the energization of the time delay relay, circuit means including at least one of the normally closed contact members of the line switch for connecting the high speed relay for energization upon closure of the load circuit, and relay means responsive to the reduction of the voltage of the load circuit for maintaining an energizing circuit for the time delay relay so as to maintain the line switch in the operated position for a predetermined interval of time after the load circuit is opened.

6. In a safety control system for a power system having a transformer source with a relatively low voltage tap, a load circuit, and manual means for opening and closing the load circuit, the combination of a normally open line switch operable to connect the load circuit to the source having a plurality of normally closed auxiliary contact members, time delay means for effecting operation of the line switch, a normally deenergized relay operable to initiate the operation of the time delay relay having a plurality of normally open contact members, an energizing circuit for the control relay including at least one of the normally closed line switch auxiliary contact members, circuit means including at least one of said normally open contact members and at least one of the normally closed auxiliary contact members for providing a holding circuit for the control relay until the line switch operates, and means responsive to the flow of the load current for maintaining the time delay relay in the operated position while the load circuit is closed.

7. The combination with an electric power system having a transformer source with a relatively low voltage tap, a load circuit, and manual means for opening and closing the load circuit, of a safety control system for effecting the connection of the load circuit to the low voltage source when the load circuit is open comprising, a line switch operable to connect the load circuit to the source, said line switch having a plurality of normally closed contact members, a time delay relay for effecting operation of the line switch and maintaining it in the operated position for a predetermined interval of time after the load circuit has been opened, a normally deenergized control relay for initiating the operation of the time delay relay having an operating winding and a plurality of normally open contact members, an energizing circuit connecting the operating winding of the control relay to the low voltage tap through at least one of the normally closed contact members of the line switch for effecting the operation of the control relay upon the closure of the load circuit, circuit means including another of the normally closed contact members of the line switch and at least one of the normally open contact members of the control relay for providing a holding circuit for retaining the control relay in the operated position until the line switch operates, and means responsive to the continued closure of the load circuit to retain the time delay relay in the operated position.

GEORGE E. KING.